US006879303B2

(12) United States Patent
Kaneyasu

(10) Patent No.: US 6,879,303 B2
(45) Date of Patent: Apr. 12, 2005

(54) APERTURE GRILL TYPE DISPLAY DEVICE AND METHOD FOR CONTROLLING LUMINANCE

(75) Inventor: Isamu Kaneyasu, Kato (JP)

(73) Assignee: Fujitsu Limited, Kawasaki (JP)

( * ) Notice: Subject to any disclaimer, the term of this patent is extended or adjusted under 35 U.S.C. 154(b) by 318 days.

(21) Appl. No.: 10/305,060

(22) Filed: Nov. 27, 2002

(65) Prior Publication Data

US 2003/0231192 A1 Dec. 18, 2003

(30) Foreign Application Priority Data

Jun. 18, 2002 (JP) ....................................... 2002-177515

(51) Int. Cl.[7] ................................................ H04N 5/213

(52) U.S. Cl. ............................ 345/11; 345/10; 345/24; 345/47; 345/63; 345/77; 348/806; 445/37

(58) Field of Search ............................... 345/10, 11, 24, 345/47, 63, 77; 248/806; 445/37

(56) References Cited

U.S. PATENT DOCUMENTS 5,542,868 A * 8/1996 Kozuka ....................... 445/37
6,166,782 A * 12/2000 Cappels ...................... 348/806

* cited by examiner

*Primary Examiner*—Bipin Shalwala
*Assistant Examiner*—Vincent E. Kovaick
(74) *Attorney, Agent, or Firm*—Westerman, Hattori, Daniels & Adrian, LLP

(57) ABSTRACT

An aperture grill type display device is provided that displays a picture including two areas whose luminance values are different from each other without vertical stripes. The aperture grill type display device includes an aperture grill to which plural wires are attached. When displaying a picture including a window whose luminance value is higher than that of a desktop, the luminance value of the window is decreased if the energy that electron beams emitted from an electron gun of the display device give to the wires for displaying the window exceeds the energy that the electron beams give to all the wires by a predetermined ratio.

8 Claims, 9 Drawing Sheets

LUMINANCE L0=100cd/m$^2$
LUMINANCE L1=400cd/m$^2$

LUMINANCE L0=100cd/m$^2$
LUMINANCE L1=500cd/m$^2$

APERTURE GRILL TYPE DISPLAY DEVICE AND METHOD FOR CONTROLLING LUMINANCE

BACKGROUND OF THE INVENTION

1. Field of the Invention

The present invention relates to luminance control of an aperture grill type display device.

2. Description of the Prior Art

FIGS. 9A–9C are diagrams for explaining mechanisms of a color image display in the conventional CRT display device 9. FIGS. 10A and 10B are diagrams showing examples of a display picture SN9 displayed on a display screen of the CRT display device 9. A CRT portion (a Braun tube) of the conventional CRT display device 9 comprises an electron gun 91, a color discrimination mechanism 92 and a fluorescent surface 93. The fluorescent surface 93 includes stripe fluorescent films 93*r*, 93*g* and 93*b* that are arranged in turn and are elongated in the vertical direction of the CRT display device 9.

The electron gun 91 includes three cathodes 91*r*, 91*g* and 91*b*, which emit electron beams 8*r*, 8*g* and 8*b*, respectively. There is a type of the electron gun 91 that has one cathode emitting three electron beams 8*r*, 8*g* and 8*b*. The emitted electron beams 8*r*, 8*g* and 8*b* hit the fluorescent films 93*r*, 93*g* and 93*b*, respectively. Then, red, green and blue light rays are generated from the portions hit by the electron beams, respectively. Various kinds of colors can be reproduced by adjusting intensity values of the electron beams 8*r*, 8*g* and 8*b*. While adjusting the intensity values, the electron beams 8*r*, 8*g* and 8*b* are deflected so as to scan the entire fluorescent surface 93. Thus, a color image can be displayed on the entire screen of the CRT display device 9.

The color discrimination mechanism 92 is used for leading the electron beam 8 to hit a predetermined position on the fluorescent surface 93 with precision. A shadow mask or an aperture grill is used as the color discrimination mechanism 92. As shown in FIG. 9B, the shadow mask is a metal plate 92*a* with many openings 92*h* arranged regularly. Namely, only electron beams 8 that passed through the openings 92*h* can hit the fluorescent surface 93. Thus, it is possible for the electron beam 8 to hit a predetermined position precisely.

However, there are some problems when using the shadow mask. One of them is that luminance drops as departing from the center of the fluorescent surface 93. Another problem is that heat generated by energy of the electron beam 8 may deform the shadow mask so that an image can be blurred as a whole.

As shown in FIG. 9C, the aperture grill comprises many wires 92*b* arranged at a constant narrow pitch. Each of the wires 92*b* is stretched by tension in the vertical direction (in the length direction). Some of the emitted electron beams 8 pass openings 92*h*' between neighboring two wires 92*b* so as to hit the fluorescent surface 93. Thus, the electron beam 8 can hit a predetermined position precisely.

The usage of the aperture grill can solve the above-mentioned problem of the shadow mask. Namely, since the aperture grill has the openings 92*h*' that are larger than the openings 92*h* of the shadow mask, more electron beams 8 can hit the fluorescent surface 93, so that images can be displayed more clearly.

In addition, even if the wire 92*b* is elongated by the energy of the electron beams 8, the positions of the openings 92*h*' are not changed since the wire 92*b* is always stretched by the tension in the vertical direction. Therefore, images do not become blurred as distinct from the shadow mask.

However, when using an aperture grill, vertical stripes can appear in the display picture. For example, it is supposed that a display picture SN9 indicating a state of opening a vertically elongated window WD9 on a desktop DS9 of an operating system (OS) is displayed on the screen of the display device 9 as shown in FIG. 10A.

If there is not large difference between luminance values in the entire display picture SN9, vertical stripes do not appear in the display picture SN9. It is because that there is not large difference between elongation ratios of the wires 92*b* due to the energy of the electron beams, so that all the wires 92*b* are stretched by the tension in the vertical direction and the positions of the openings 92*h*' are retained at the proper positions.

However, when the luminance of the window WD9 is increased to be higher than the luminance of other areas, i.e., the desktop DS9, vertical stripes can appear in the portion of the window WD9 as shown in FIG. 10B. The reason of this is as follows.

When electron beams having high energy for displaying the window WD9 hit a specific wire 92*b* (hereinafter, referred to as the wire 92*bw*) in a concentrated manner, the wire 92*bw* may become longer than other wires (hereinafter, referred to as the wire 92*bd*). If the difference between the elongation ratios is too large, the tension in the vertical direction and the restoration force of the wire 92*bd* can be balanced when the wire 92*bd* is stretched to some extent by the tension in the vertical direction. Then, the tension in the vertical direction cannot act on the wire 92*bw*, which may remain sagged. Thus, the wire 92*bw* can vibrate or be entangled in a neighbored wire 92*b* so that the position of the opening 92*h*' can be changed. Thus, the electron beams cannot hit the fluorescent surface 93 properly, so that the vertical stripes can appear as shown in FIG. 10B.

SUMMARY OF THE INVENTION

An object of the present invention is to provide an aperture grill type display device that can display a picture including two areas having different luminance values without vertical stripes.

A control method according to the present invention is a method for controlling luminance in an aperture grill type display device including an aperture grill to which a plurality of wires is attached. The method comprises the steps of determining whether the energy that electron beams emitted from an electron gun of the display device give to the wires for displaying an area whose luminance value is higher than luminance value of the other area exceeds the energy that the electron beams give to all the wires by a predetermined ratio when displaying a picture including an area whose luminance value is higher than luminance value of the other area, and decreasing the luminance value of the area whose luminance value is higher than luminance value of the other area if the result of the determination is true.

A display device according to the present invention is an aperture grill type display device including an aperture grill to which a plurality of wires is attached. The display device comprises a determination portion for determining whether the energy that electron beams emitted from an electron gun of the display device give to the wires for displaying an area whose luminance value is higher than luminance value of the other area exceeds the energy that the electron beams give to all the wires by a predetermined ratio when displaying a picture including an area whose luminance value is higher than luminance value of the other area, and a luminance control portion for decreasing the luminance value of the area whose luminance value is higher than luminance value of the other area if the result of the determination is true.

Preferably, the display device comprises a determination portion for determining whether the energy that electron beams emitted from an electron gun of the display device give to the wires for displaying an image of a designated area in a display area of the display device exceeds the energy that the electron beams give to all the wires by a predetermined ratio when setting luminance of the designated area to a first luminance value and luminance of the other area to a second luminance value that is lower than the first luminance value, and a luminance control portion for controlling the luminance of the designated area and the luminance of the other area to be the first luminance value and the second luminance value respectively if the result of the determination is false, and for controlling the luminance of the designated area or the luminance of the other area so that the absolute value of the difference between the luminance of the designated area and the luminance of the other area becomes smaller than the absolute value of the difference between the first luminance value and the second luminance value if the result of the determination is true.

Alternatively, the luminance control portion controls the luminance of the designated area to be a luminance value between the second luminance value and the first luminance value and controls the luminance of the other area to be the second luminance value if the determination portion determines that the former energy exceeds the latter energy by the predetermined ratio. Alternatively, the determination portion performs the determination in accordance with a ratio of the number of dots of the designated area in the vertical direction to the total number of dots of the display area in the vertical direction and a ratio of the number of dots of the designated area in the horizontal direction to the total number of dots of the display area in the horizontal direction. Alternatively, the display device further comprises a communication portion for communicating with a picture information output device that outputs picture information for displaying a picture. The designated area is designated by the picture information output device and the determination portion performs the determination every time when the picture information output device designates the designated area.

A picture information output device according to the present invention is a device that outputs picture information for displaying a picture to an aperture grill type display device that includes an aperture grill to which a plurality of wires is attached. The picture information output device comprises a designation portion for designating an area that is displayed with high luminance in a display area of the display device to the display device, a determination portion for determining whether the energy that electron beams emitted from an electron gun of the display device give to the wires for displaying an image of a designated area designated by the designation portion exceeds the energy that the electron beams give to all the wires by a predetermined ratio when setting luminance of the designated area to a first luminance value and luminance of the other area to a second luminance value that is lower than the first luminance value to display a picture on the display device, and an instruction portion for instructing the display device to display the picture with setting the luminance of the designated area to the first luminance value and the luminance of the other area to the second luminance value if the result of the determination is false, and for instructing the display device to display the picture so that the absolute value of the difference between the luminance of the designated area and the luminance of the other area becomes smaller than the absolute value of the difference between the first luminance value and the second luminance value if the result of the determination is true.

DESCRIPTION OF THE PREFERRED EMBODIMENTS

Hereinafter, the present invention will be explained more in detail with reference to embodiments and drawings.

Figure 1:
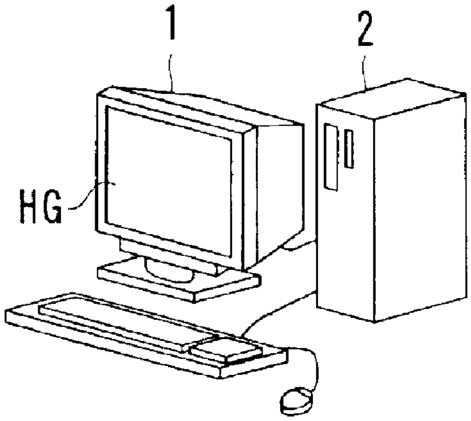
FIG. 1 is a diagram showing an example of appearance of a display device and a computer body according to the present invention.
Figure 2:
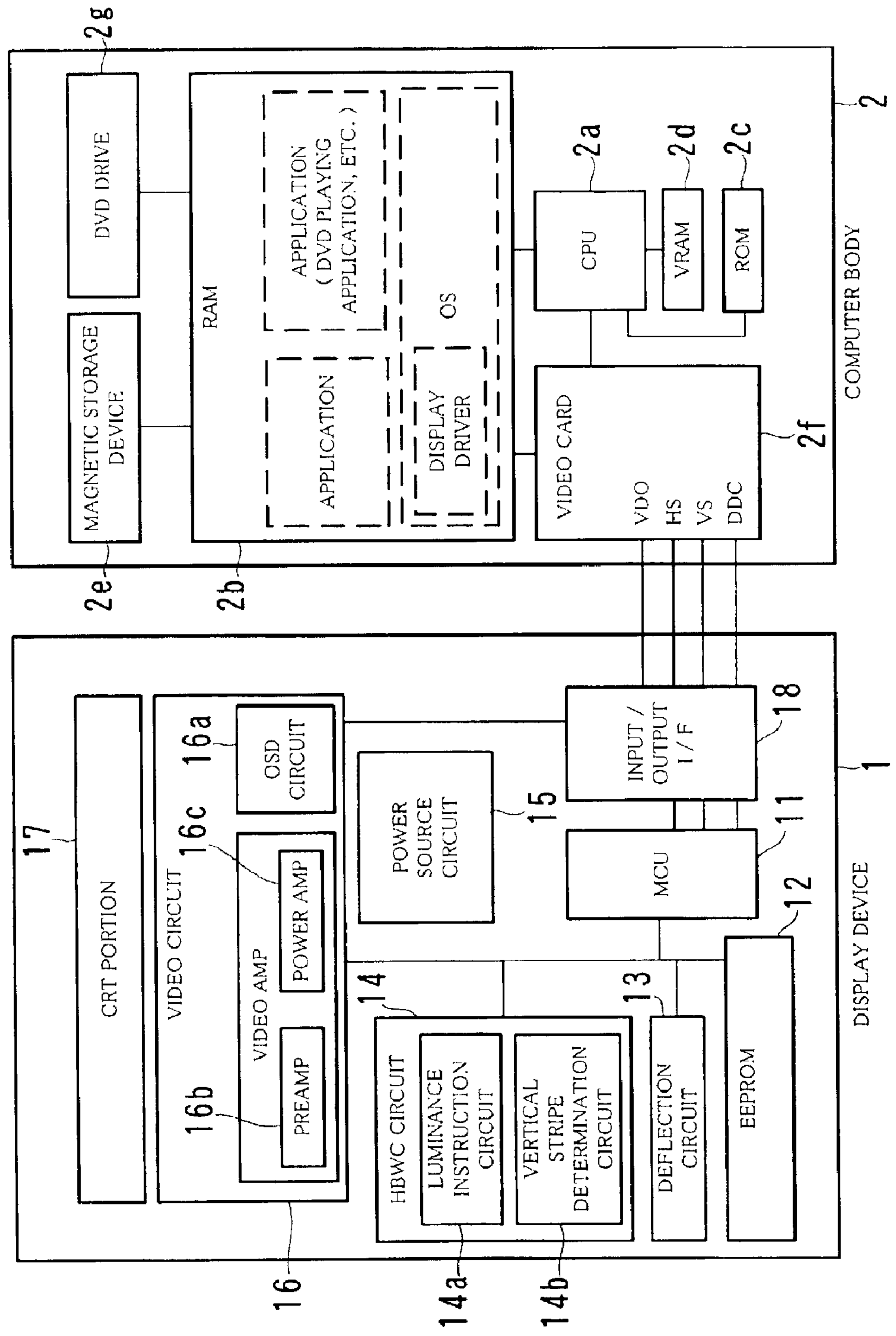
FIG. 2 is a diagram showing an example of a hardware structure of the display device and the computer body.
Figure 3A:
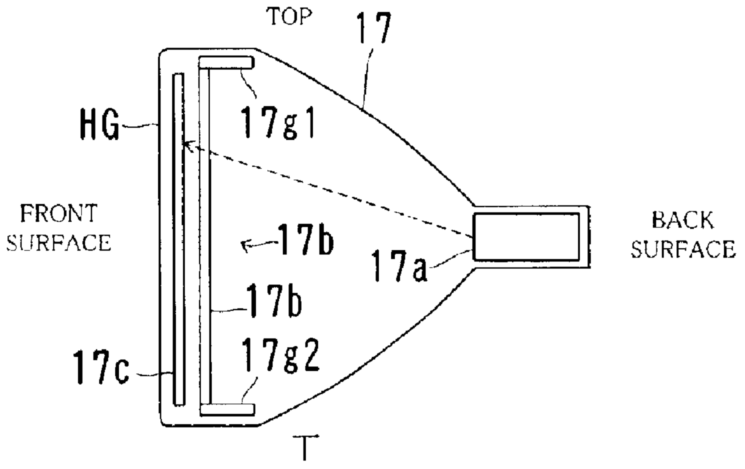
FIGS. 3A and 3B are diagrams showing structures of a CRT portion.
Figure 3B:
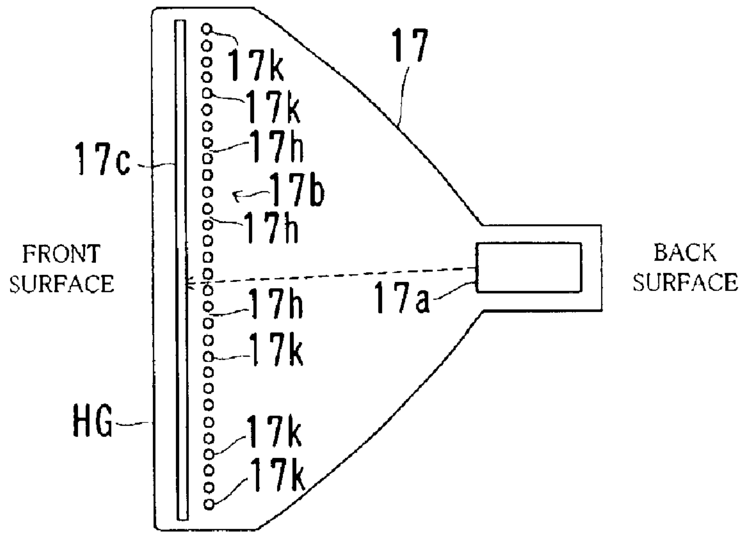
Figure 4:
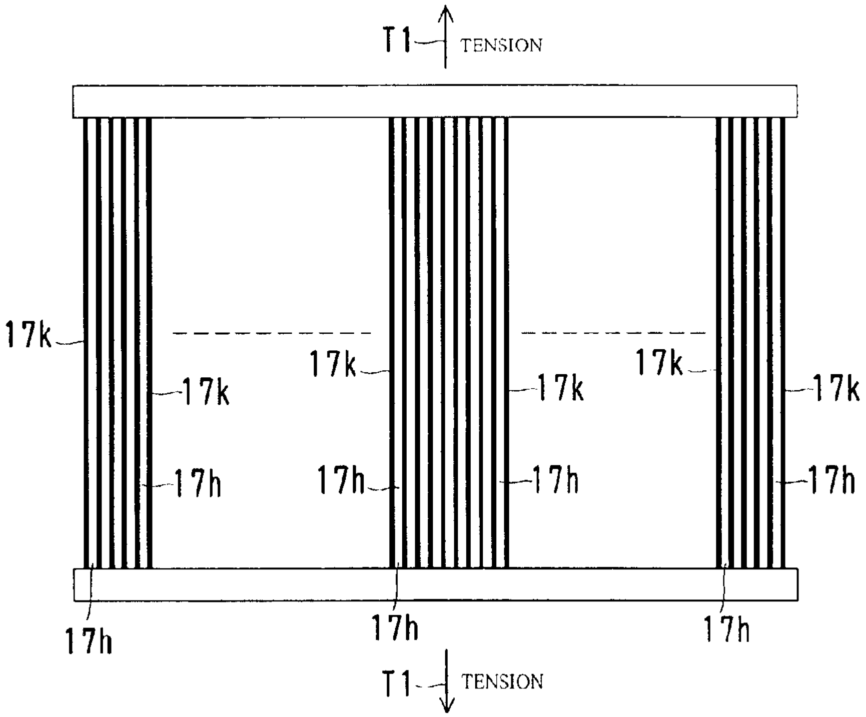
FIG. 4 is a diagram showing an example of a structure of an aperture grill.
Figure 5A:
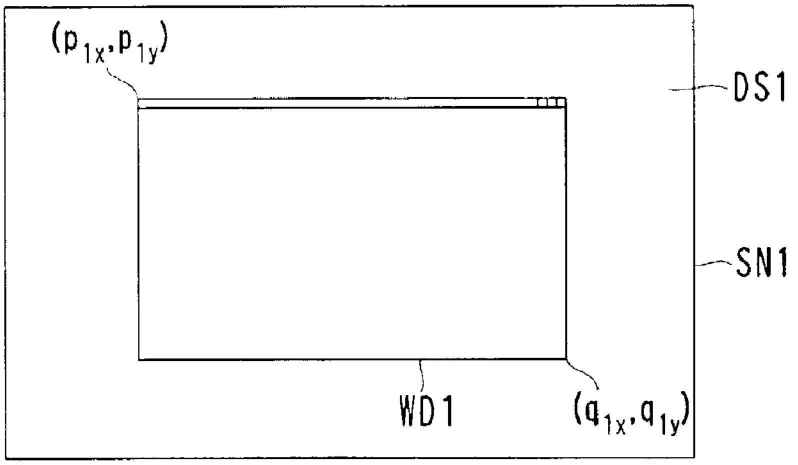
FIGS. 5A and 5B are diagrams showing examples of display pictures displayed on a display screen.
Figure 5B:
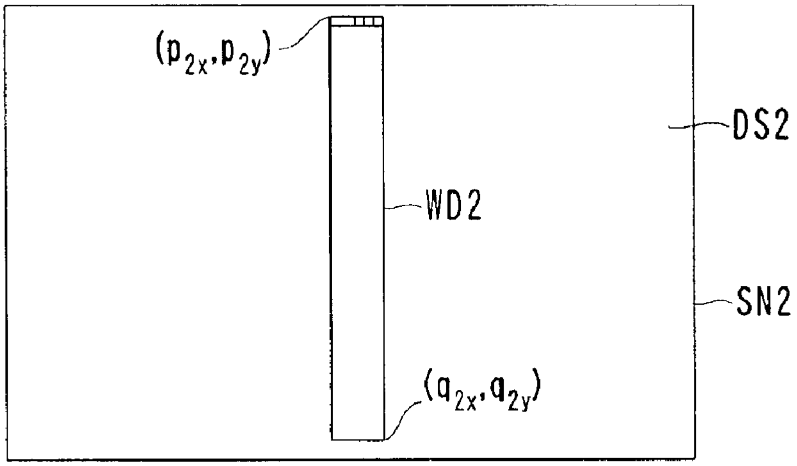
Figure 6:
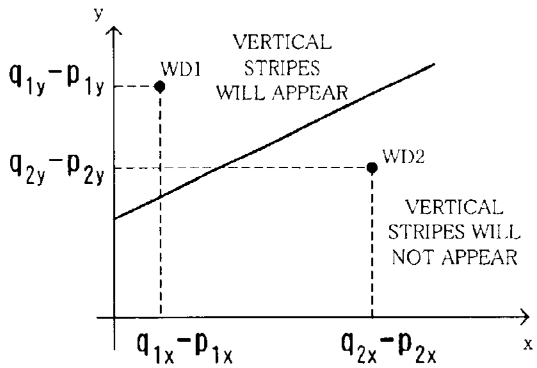
FIG. 6 is a diagram showing the relationship between the lengths of the designated area in the x-direction and the y-direction and appearance of vertical stripes.
Figure 7A:
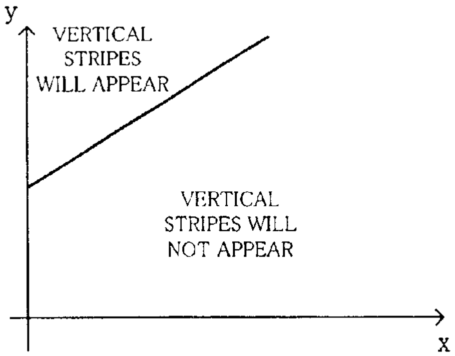
FIGS. 7A and 7B are diagrams for comparing presence or absence of vertical stripes when luminance values in the designated area are different from each other.
Figure 7B:
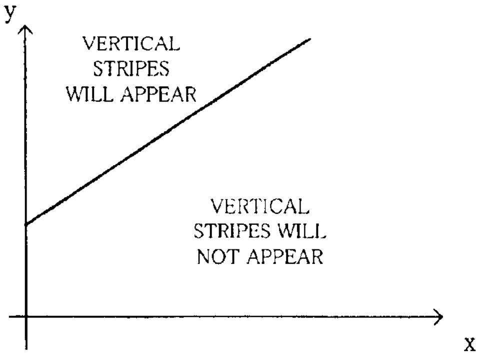
Figure 8:
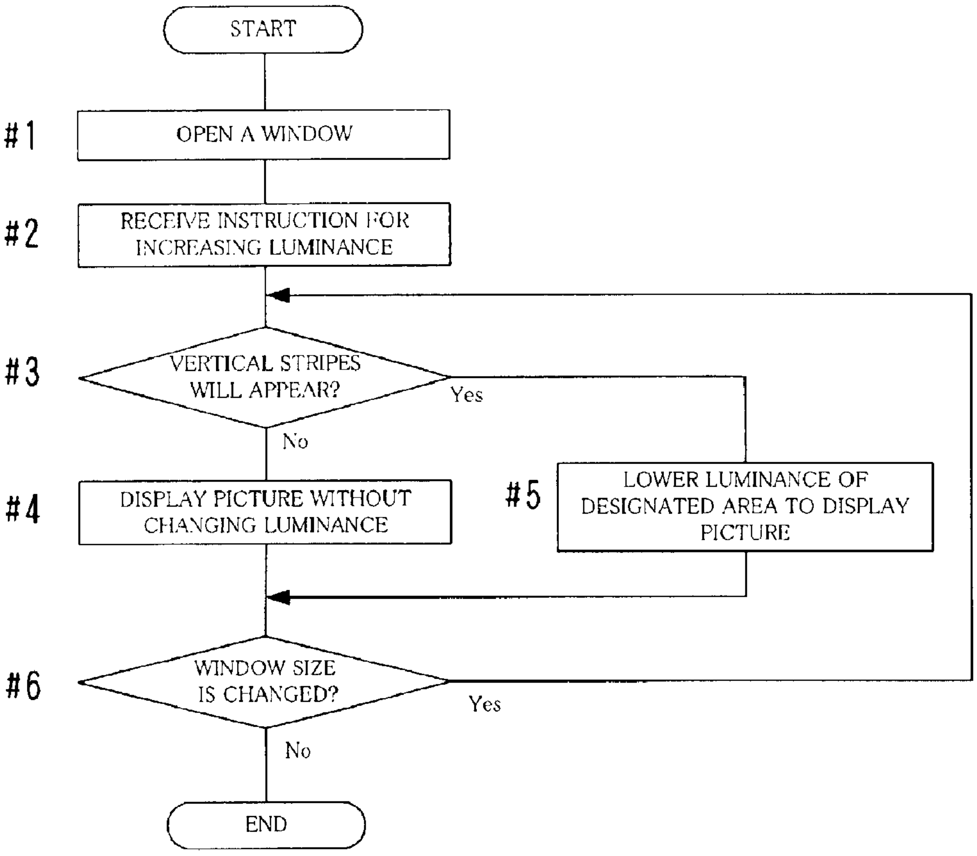
FIG. 8 is a flowchart for explaining a process of the display device.

FIG. 1 is a diagram showing an example of appearance of a display device 1 and a computer body 2 according to the present invention. FIG. 2 is a diagram showing an example of a hardware structure of the display device 1 and the computer body 2. FIGS. 3A and 3B are diagrams showing structures of a CRT portion 17. FIG. 4 is a diagram showing an example of a structure of an aperture grill **17*b*. FIGS. 5A and 5B are diagrams showing examples of display pictures SN1 and SN2 displayed on a display screen HG. FIG. 6 is a diagram showing the relationship between the lengths of the designated area in the x-direction and the y-direction and appearance of vertical stripes. FIGS. 7A and 7B are diagrams for comparing presence or absence of vertical stripes when luminance values L1 in the designated area are different from each other. FIG. 8 is a flowchart for explaining a process of the display device 1**.

The aperture grill type display device 1 according to the present invention is connected to the computer body 2 as shown in FIGS. 1 and 2. The display device 1 displays an image on the display screen HG in accordance with a video signal (image information) and other signals given by the computer body 2. The connection interface can be DDC (Display Data Channel) standard, for example.

The display device 1 comprises a MCU (Memory Control Unit) 11, an EEPROM (Electrically Erasable Programmable ROM) 12, a deflection circuit 13, an HBWC (High Bright Window Control) circuit 14, a power source circuit 15, a video circuit 16, a CRT portion 17 and an input/output interface 18.

The EEPROM 12 stores information about a specification of the display device 1 and set information of the display device 1 for each display mode (resolution such as VGA or XGA). The MCU 11 recognizes a current display mode in accordance with a horizontal synchronizing signal HS and a vertical synchronizing signal VS that are given via the input/output interface 18, and extracts the set information corresponding to the display mode from the EEPROM 12 so as to set the display device 1.

The deflection circuit 13 performs control about size, position, pincushion and others of an image to be displayed in the display screen HG. The power source circuit 15 supplies power to the circuits and the devices of the display device 1.

The HBWC circuit 14 includes a luminance instruction circuit 14*a* and a vertical stripe determination circuit 14*b*, for performing setting about luminance of each area of a picture to be displayed. For example, in the display picture SN1 shown in FIG. 5A, luminance values of the window WD1 and the desktop DS1 are set to 400 cd/m$^2$ and 100 cd/m$^2$, respectively. The method of setting will be explained later.

The video circuit 16 includes an OSD circuit 16*a*, a preamplifier 16*b* and a power amplifier 16*c*. The OSD circuit 31*a* performs control for OSD (On-Screen Display). The preamplifier 16*b* controls luminance, contrast and color tone of RGB for adjusting signals in accordance with the video signal from the computer body 2 and an instruction from the HBWC circuit 14. The power amplifier 16*c* amplifies the signals adjusted by the preamplifier 16*b* to an appropriate level.

Figure 9A:
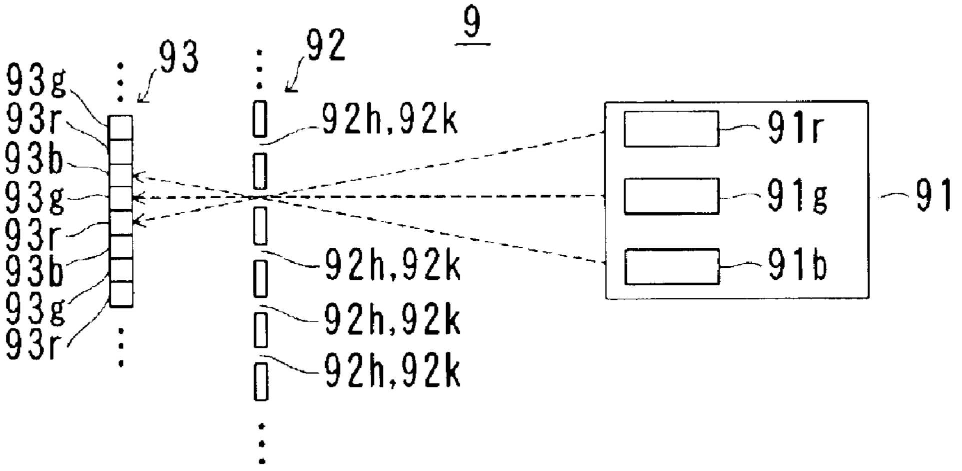
FIGS. 9A–9C are diagrams for explaining mechanisms of a color image display in the conventional CRT display device.
Figure 9B:
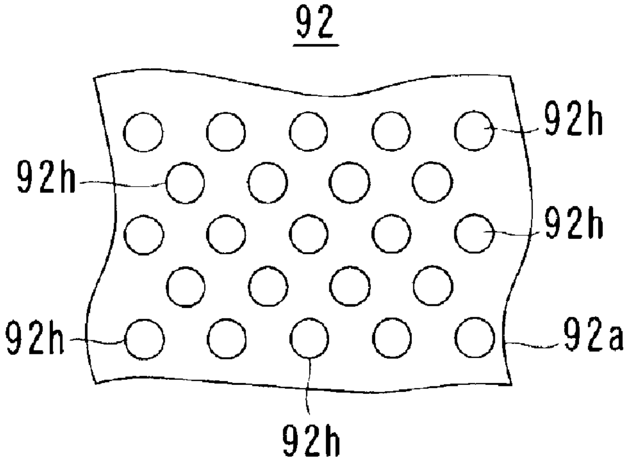
Figure 9C:
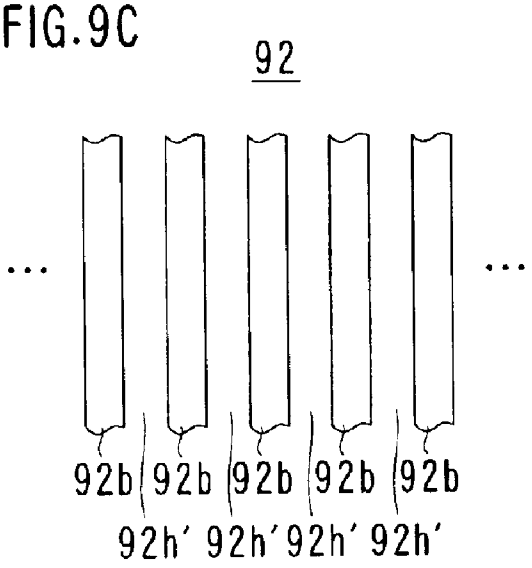

The CRT portion 17 comprises an electron gun 17*a*, an aperture grill 17*b* and a fluorescent surface 17*c* as shown in FIGS. 3A and 3B. The electron gun 17*a* emits electron beams in accordance with signals given by the video circuit 16. In this way, a picture (an image) as shown in FIG. 5A or 5B is displayed on the display screen HG. The mechanism of displaying the image is as explained with reference to FIGS. 9A–9C.

The aperture grill 17*b* comprises two grilles 17*g*1 and 17*g*2 and many wires 17*k* that are arranged at a constant pitch as shown in FIG. 4. The aperture grill 17*b* is also called a stripe mask. Both ends of the wire 17*k* are fixed to the grilles 17*g*1 and 17*g*2. An opening 17*h* is formed between neighboring two wires 17*k*. The pitch of the openings (an aperture grill pitch) is approximately 0.2–0.3 millimeters. The grilles 17*g*1 and 17*g*2 stretch the wires 17*k* in the vertical direction. This tension T1 makes the wires 17*ks* be strained. In addition, one or more control wires (damper wires) are stretched in the horizontal direction between the grilles 17*g*1 and 17*g*2 for aligning the wires 17*k*.

The computer body 2 comprises a CPU 2*a*, a RAM 2*b*, a ROM 2*c*, a VRAM 2*d*, a magnetic storage device 2*e*, a video card 2*f* and a DVD (Digital Versatile Disc) drive 2*g*. In the magnetic storage device 2*e*, an operating system (OS), an application program for reproducing moving images (e.g., a DVD playing application) and other various programs are installed. The operating system includes a display driver for controlling the display device 1.

These programs are loaded into the RAM 2*b* as needed and executed by the CPU 2*a*. The execution of the program or a user's operation generates a picture to be displayed on the display screen HG of the display device 1. For example, when the DVD playing application is executed, display pictures of frames of a movie or an animation are generated in accordance with the video information of the DVD software read by the DVD drive 2*g*. Alternatively, when an icon on the screen (on the desktop) is double-clicked, a process of searching a file corresponding to the icon is performed so that a display picture is generated indicating the state in which a window showing contents of the file is opened. The generated display picture is converted into the video signal by the video card 2*f* and sent to the CRT portion 17 of the display device 1. Then, it is displayed on the display screen HG of the display device 1 as the display pictures SN1 and SN2 shown in FIGS. 5A and 5B.

The DVD playing application instructs the display device 1 to make a luminance value of the window WD in which an image is displayed (WD1 or WD2) higher than a luminance value of the desktop DS (DS1 or DS2) or other windows when performing the process of reproducing an image. Such an instruction is transmitted to the display device 1 by the video card 2*f* together with position information indicating a position of the window WD. For example, the position of the window WD1 shown in FIG. 5A is designated like "($p_x$, $p_y$), ($q_x$, $q_y$)". Hereinafter, the area that is designated by coordinates as above may be referred to as a "designated area".

As the computer body 2, a personal computer, a workstation, a DVD player or a video game machine can be used.

Figure 10A:
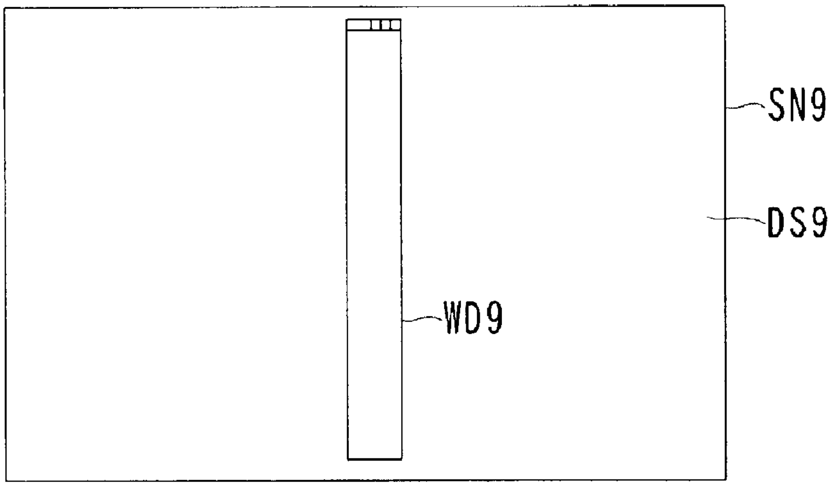
FIGS. 10A and 10B are diagrams showing examples of a display picture displayed on a display screen of the CRT display device.
Figure 10B:
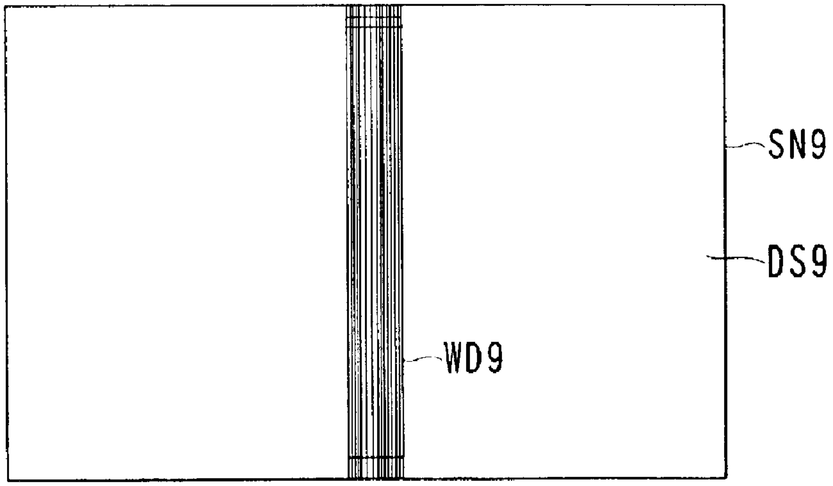

In the display device 1, when receiving the instruction for raising luminance of the designated area, the vertical stripe determination circuit 14*b* of the HBWC circuit 14 determines whether the vertical stripes as shown in FIG. 10B will appear or not in the case where only the luminance value of the window WD1 (the designated area) is increased from the luminance L0 to the luminance L1 while the luminance value of the desktop DS is kept at the standard luminance L0. The following inequality (1) is used for the determination. It is determined that the vertical stripes will appear if the inequality (1) is satisfied and that the vertical stripes will not appear if the inequality (1) is not satisfied.

$$yRATE>yDENGER \qquad (1)$$

Here, yDENGER=K1×xRATE+K2;

xRATE=(($q_x$−$p_x$)/xTOTAL):(display ratio of the window WD in the x-direction);

yRATE=(($q_y$−$p_y$)/yTOTAL):(display ratio of the window WD in the y-direction);

xTOTAL is a length of the entire display (the number of entire dots) in the x-direction (the horizontal direction);

yTOTAL is a length of the entire display (the number of entire dots) in the y-direction (the vertical direction); and K1 and K2 are constants.

It is understood from the inequality (1) that if the display ratio of the designated area in the y-direction (yRATE) is larger than the display ratio in the x-direction (xRATE), i.e., if the designated area is more longitudinal in the vertical direction, the vertical stripes can be determined to appear more. For example, if luminance values of the windows WD1 and WD2 are identical to each other and the luminance values of the desktops DS1 and DS2 are identical to each other, the display picture SN2 having a vertically longitudinal window WD2 is determined to generate more vertical stripes than the display picture SN1 having a horizontally longitudinal window WD1, as shown in FIG. 6.

It is understood also from the following fact that the vertical stripes can be determined to appear more if the designated area is more longitudinal in the vertical direction. Namely, electron beams emitted from the electron gun 17*a* hit the wire 17*k* that is used for displaying the designated area (hereinafter, referred to as the wire 17*k*') among all wires 17*k* of the aperture grill 17*b* in a concentrated manner and give energy to the wire 17*k*'. Therefore, the longer in the vertical direction the designated area is, the more the energy concentration per one wire 17*k*' increases. When the concentration increases, the wire 17*k*' is stretched more so that the vertical stripes can appear easily. On the contrary, if the designated area is longitudinal in the horizontal direction, the number of wires 17*k*' increases. As a result, the energy concentration per one wire 17*k*' decreases and the vertical stripes do not appear easily.

Namely, it can be said that the inequality (1) is used for determining whether energy that is given to the wire 17*k*' exceeds the energy that is given to all the wires 17*k* of the aperture grill 17*b* by a predetermined ratio.

The constants K1 and K2 depend on characteristics of the display device 1 (e.g., characteristics such as a tension T1 applied to the wire 17*k*, an expansion ratio of the wire 17*k*, a restoration force of the wire 17*k* or a thickness of the wire 17*k*, the number of wires 17*k* attached to the aperture grill 17*b* or the pitch of openings) and conditions for use (luminance of the designated area, luminance of the other areas, temperature or humidity), but they are determined in an experimental manner.

For example, the constant K1 is set to a lower value if the difference between the luminance L1 of the designated area and the luminance L0 of the other area (i.e., standard luminance) is larger. Therefore, as understood by comparing FIG. 7A with FIG. 7B, when the luminance of the designated area is increased to be higher than the luminance of the other area, the threshold level yDENGER in the inequality (1) decreases and it is easy to be determined that vertical stripes can appear.

It is possible that the DVD playing application sets the luminance values L0 and L1 automatically in accordance with contents of the DVD software. Alternatively, it is possible that a user operates a keyboard of the computer body 2 or an adjustment button of the display device 1 for designation. The values of the constants K1 and K2 may be stored in the EEPROM 12 for each combination of the luminance values L0 and L1. Then, constants values K1 and K2 corresponding to the designated luminance values L0 and L1 are searched and assigned to the inequality (1).

If it is determined that the vertical stripes will not appear on the display picture, the luminance instruction circuit 14*a* instructs the video circuit 16 to increase the luminance of the window WD1 (the designated area) from the luminance value L0 to the luminance value L1 while maintaining the luminance of the desktop DS at the standard luminance L0. If it is determined that the vertical stripes can appear on the display picture, the luminance instruction circuit 14*a* instructs the video circuit 16 to decrease the luminance of the designated area to be lower than the luminance value L1. For example, the luminance instruction circuit 14*a* instructs the video circuit 16 to set the luminance of the designated area to the medium value between the luminance L1 and the luminance L0. Alternatively, it is instructed to set the luminance of the designated area to the luminance of the other area. The luminance value can be adjusted by lowering contrast or brightness.

Then, the video circuit 16 controls the luminance of the designated area and the luminance of the other area in accordance with the instruction from the HBWC circuit 14. The CRT portion 17 emits electron beams in accordance with the control of the video circuit 16, so as to display a picture (an image) on the display screen HG.

Next, the process of the display device 1 will be explained with reference to the flowchart shown in FIG. 8. In the computer body 2, a DVD playing application is started so as to open a window of a moving image (#1). Then, the display device 1 receives the instruction from the computer body 2 for increasing the luminance of the window from the standard luminance value L0 to the luminance value L1 (#2).

It is determined whether the vertical stripes will appear in the display picture when the luminance of the window (the designated area) is increased to the luminance value L1 (#3). If it is determined that the vertical stripes will not appear (No in #3), the luminance of the window and the luminance of the other area set to the luminance values L1 and L0, respectively, so as to display the picture (#4). If it is determined that the vertical stripes will appear (Yes in #3), the luminance of the window is lowered to a value between the luminance values L0 and L1 so as to display the picture. For example, the luminance is lowered to the medium value between the luminance values L0 and L1.

When the window size is changed in the computer body 2 (Yes in #6), the determination whether the vertical stripes will appear or not is performed again (#3), and the luminance adjustment is performed again (#4 and #5). Similarly, the process of Steps #3–#5 is performed again when the window that increases the luminance is designated newly.

According to this embodiment, even if the luminance of the designated area is set to a value higher than the luminance of the other area, the vertical stripes will not appear in displaying the picture. Especially, even if the difference between the luminance values of two areas is large, the luminance value is adjusted in accordance with the result of the determination whether the vertical stripes will appear or not. Therefore, a display picture that includes two areas having luminance levels that are different from each other largely can be displayed more appropriately than the conventional device.

Though the display device 1 performs the determination whether the vertical stripes will appear or not in this embodiment, it is possible that the computer body 2 performs the determination. For example, a program for performing the process of the vertical stripe determination circuit 14*b* may be included in the display driver of the computer body 2. The CPU 2*a* may execute the program in accordance with the coordinates of the designated area and determine whether the vertical stripes will appear or not. Then, if it is determined that the vertical stripes will appear, the display device 1 is instructed to lower the luminance of the designated area.

When setting the luminance of a window for reproducing a moving image whose stream is distributed from a server on the Internet, a window for reproducing a moving image in accordance with a MPEG file, or a window for reproducing a moving image given by a video deck or a video camera, other than the window for playing the DVD software, to a luminance value higher than that of the other area, the picture can be displayed without generating the vertical stripes according to the above-mentioned process.

When it is determined that the vertical stripes will appear, the difference between the luminance value of the designated area and the luminance value of the other area may be decreased by increasing the luminance value of the other area instead of decreasing the luminance value of the designated area. Alternatively, both the luminance levels of the designated area and the other area may be adjusted.

In addition, the structure, the process contents or the process order of the display device 1 or the computer body 2 can be modified as necessary in the scope of the present invention.

According to the present invention, a display picture having two areas whose luminance values are different from each other can be displayed without vertical stripes.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A method for controlling luminance in an aperture grill type display device including an aperture grill to which a plurality of wires is attached, the method comprising the steps of:

determining whether the energy that electron beams emitted from an electron gun of the display device give to the wires for displaying an area whose luminance value is higher than luminance value of the other area exceeds the energy that the electron beams give to all the wires by a predetermined ratio when displaying a picture including an area whose luminance value is higher than luminance value of the other area; and decreasing the luminance value of the area whose luminance value is higher than luminance value of the other area if the result of the determination is true.

2. An aperture grill type display device comprising:

an aperture grill to which a plurality of wires is attached;

a determination portion for determining whether the energy that electron beams emitted from an electron gun of the display device give to the wires for displaying an area whose luminance value is higher than luminance value of the other area exceeds the energy that the electron beams give to all the wires by a predetermined ratio when displaying a picture including an area whose luminance value is higher than luminance value of the other area; and a luminance control portion for decreasing the luminance value of the area whose luminance value is higher than luminance value of the other area if the result of the determination is true.

3. An aperture grill type display device comprising:

an aperture grill to which a plurality of wires is attached;

a determination portion for determining whether the energy that electron beams emitted from an electron gun of the display device give to the wires for displaying an image of a designated area in a display area of the display device exceeds the energy that the electron beams give to all the wires by a predetermined ratio when setting luminance of the designated area to a first luminance value and luminance of the other area to a second luminance value that is lower than the first luminance value; and a luminance control portion for controlling the luminance of the designated area and the luminance of the other area to be the first luminance value and the second luminance value respectively if the result of the determination is false, and for controlling the luminance of the designated area or the luminance of the other area so that the absolute value of the difference between the luminance of the designated area and the luminance of the other area becomes smaller than the absolute value of the difference between the first luminance value and the second luminance value if the result of the determination is true.

4. The aperture grill type display device according to claim 3, wherein the luminance control portion controls the luminance of the designated area to be a luminance value between the second luminance value and the first luminance value and controls the luminance of the other area to be the second luminance value if the determination portion determines that the former energy exceeds the latter energy by the predetermined ratio.

5. The aperture grill type display device according to claim 3, wherein the determination portion performs the determination in accordance with a ratio of the number of dots of the designated area in the vertical direction to the total number of dots of the display area in the vertical direction and a ratio of the number of dots of the designated area in the horizontal direction to the total number of dots of the display area in the horizontal direction.

6. The aperture grill type display device according to claim 3, further comprising a communication portion for communicating with a picture information output device that outputs picture information for displaying a picture, wherein the designated area is designated by the picture information output device and the determination portion performs the determination every time when the picture information output device designates the designated area.

7. A picture information output device for outputting picture information for displaying a picture to an aperture grill type display device that includes an aperture grill to which a plurality of wires is attached, the device comprising:

a designation portion for designating an area that is displayed with high luminance in a display area of the display device to the display device;

a determination portion for determining whether the energy that electron beams emitted from an electron gun of the display device give to the wires for displaying an image of a designated area designated by the designation portion exceeds the energy that the electron beams give to all the wires by a predetermined ratio when setting luminance of the designated area to a first luminance value and luminance of the other area to a second luminance value that is lower than the first luminance value to display a picture on the display device; and an instruction portion for instructing the display device to display the picture with setting the luminance of the designated area to the first luminance value and the luminance of the other area to the second luminance value if the result of the determination is false, and for instructing the display device to display the picture so that the absolute value of the difference between the luminance of the designated area and the luminance of the other area becomes smaller than the absolute value of the difference between the first luminance value and the second luminance value if the result of the determination is true.

8. A computer-readable storage medium storing a computer program that is executed by a computer that outputs picture information for displaying a picture to an aperture grill type display device including an aperture grill to which a plurality of wires is attached, the computer program comprising the steps of:

designating an area that is displayed with high luminance in a display area of the display device to the display device;

determining whether the energy that electron beams emitted from an electron gun of the display device give to the wires for displaying an image of a designated area designated by the step of designation exceeds the energy that the electron beams give to all the wires by a predetermined ratio when setting luminance of the designated area to a first luminance value and luminance of the other area to a second luminance value that is lower than the first luminance value for displaying a picture on the display device;

instructing the display device to display the picture with setting the luminance of the designated area to the first luminance value and the luminance of the other area to the second luminance value if the result of the determination is false; and instructing the display device to display the picture so that the absolute value of the difference between the luminance of the designated area and the luminance of the other area becomes smaller than the absolute value of the difference between the first luminance value and the second luminance value if the result of the determination is true.

* * * * *